United States Patent
Yadav et al.

(10) Patent No.: US 9,743,269 B1
(45) Date of Patent: Aug. 22, 2017

(54) ANALYTICS TRIGGERED SUBSCRIBER POLICIES

(71) Applicant: Juniper Networks, Inc., Sunnyvale, CA (US)

(72) Inventors: Chitresh Kumar Yadav, Bangalore (IN); Rahul Suhas Vaidya, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 17 days.

(21) Appl. No.: 14/930,016

(22) Filed: Nov. 2, 2015

Related U.S. Application Data

(63) Continuation of application No. 14/039,735, filed on Sep. 27, 2013, now Pat. No. 9,179,007.

(51) Int. Cl.
*H04M 11/00* (2006.01)
*H04W 8/18* (2009.01)
*H04M 15/00* (2006.01)

(52) U.S. Cl.
CPC .............. *H04W 8/18* (2013.01); *H04M 15/66* (2013.01)

(58) Field of Classification Search
USPC ......... 370/235, 259, 389; 455/406; 709/225, 709/223
See application file for complete search history.

(56) References Cited

U.S. PATENT DOCUMENTS

| | | | |
|---|---|---|---|
| 8,514,756 B1 | 8/2013 | Ramachandra | |
| 8,605,655 B1 | 12/2013 | Sahai | |
| 9,179,007 B1 | 11/2015 | Yadav | |
| 9,374,737 B2 * | 6/2016 | Perez Martinez | .. H04L 12/1407 |
| 2006/0052083 A1 | 3/2006 | Choi | |
| 2007/0123213 A1 | 5/2007 | Wu | |
| 2007/0230459 A1 | 10/2007 | Giaretta | |
| 2011/0299395 A1 * | 12/2011 | Mariblanca Nieves | ................... H04L 12/5695 370/235 |

(Continued)

OTHER PUBLICATIONS

"Open Flow Switch Specification," Open Networking Foundation, Version 12, Dec. 5, 2011, 83 pp.

(Continued)

*Primary Examiner* — David Q Nguyen
(74) *Attorney, Agent, or Firm* — Shumaker & Sieffert, P.A.

(57) ABSTRACT

In general, techniques are described for providing a continuous feedback system that dynamically updates data collection criteria and subscriber policies based on aggregated subscriber-specific and network usage data. For example, a method includes applying one or more subscriber specific policy and charging control (PCC) rules to network traffic to collect network traffic data for a plurality of subscribers, aggregating the network traffic data, and determining, based on the aggregated traffic data, whether subscriber independent data collection criteria need to be updated. The method may also include, responsive to determining that the data collection criteria need to be updated: updating the data collection criteria, translating the updated data collection criteria from updated subscriber independent data collection criteria into updated subscriber specific PCC rules, and applying the updated subscriber specific policy and charging control rules to additional network traffic to collect additional network traffic data.

20 Claims, 9 Drawing Sheets

(56) References Cited

U.S. PATENT DOCUMENTS

| | | | |
|---|---|---|---|
| 2013/0003736 A1 | 1/2013 | Szyszko et al. | |
| 2013/0007237 A1 | 1/2013 | Mehta et al. | |
| 2013/0036032 A1* | 2/2013 | Cai | H04M 15/46 705/30 |
| 2013/0036215 A1* | 2/2013 | Kupinsky | H04L 41/0893 709/223 |
| 2013/0091281 A1* | 4/2013 | Chai | H04L 12/14 709/225 |
| 2014/0044018 A1 | 2/2014 | Billau | |
| 2015/0092610 A1* | 4/2015 | Russell | H04M 15/66 370/259 |

OTHER PUBLICATIONS

Fajardo, et al., "Diameter Base Protocol," Internet Engineering Task Force, RFC 6733, Oct. 2012, 153 pp.

"3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, Jun. 2010, 261 pp.

"3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, Jun. 2010, 183 pp.

"3GPP TS 23.203—Policy and Charging Control Architecture (Release 10)" Version 1 0.1.0, 3rd Generation Partnership Project, Technical Specification Group Services and System Aspects, Sep. 2010, 132 pp.

"3GPP TS 29.212—Policy and Charging Control (PCC); Reference Points (Release 11)," Version 11.7.0, Feb. 2012, 197pp.

Notice of Allowance from U.S. Appl. No. 14/039,735, mailed Sep. 4, 2015, 9 pp.

\* cited by examiner

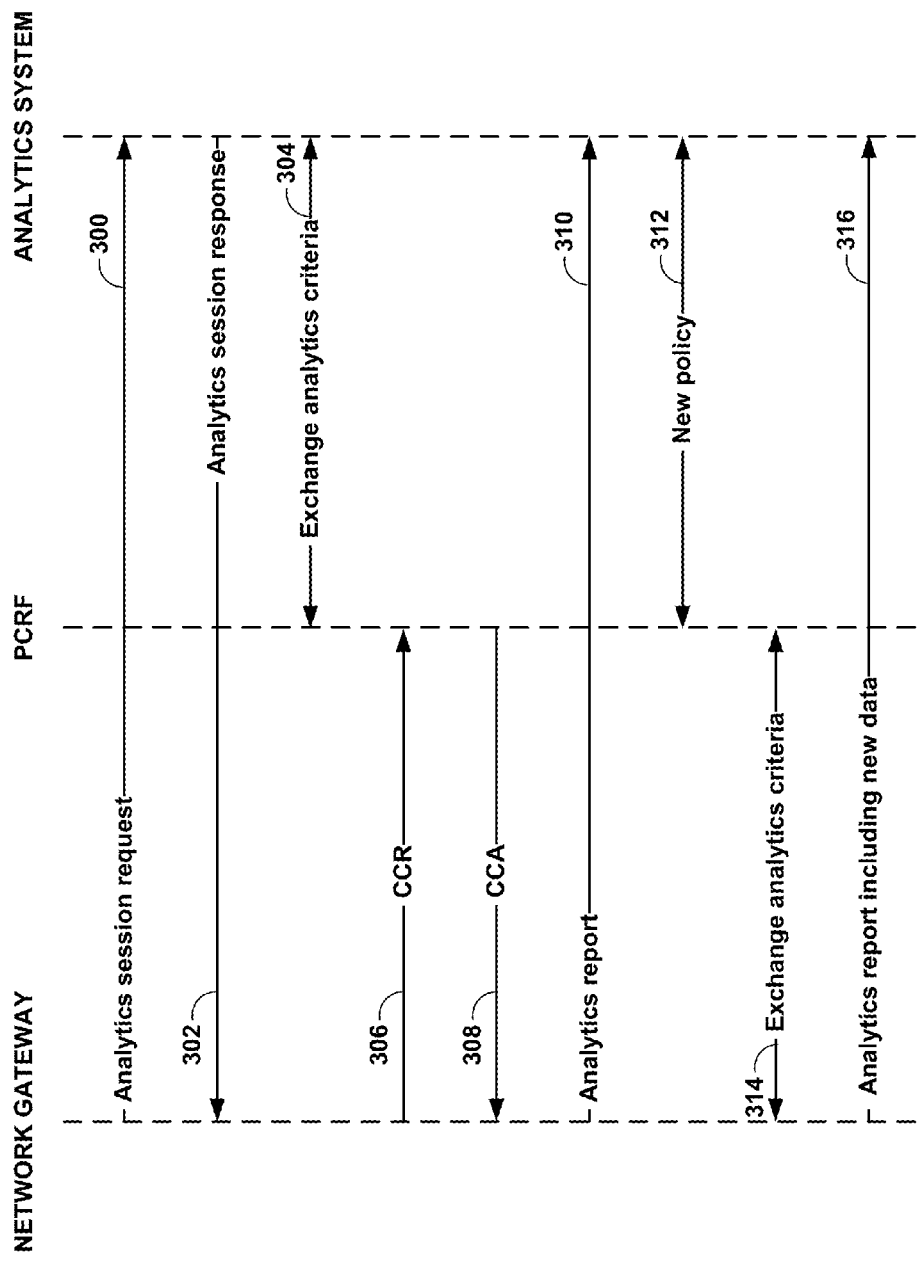

ANALYTICS TRIGGERED SUBSCRIBER POLICIES

This application is a continuation of U.S. patent application Ser. No. 14/039,735 filed Sep. 27, 2013, the entire contents of which is incorporated herein by reference.

TECHNICAL FIELD

This disclosure relates to computer networks and, more specifically, to configuring and monitoring mobile networks.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower to which are affixed a number of antennas that transmit and receive the data over the particular frequency. Wireless devices, such as cellular or mobile phones, smart phones, camera phones, personal digital assistants (PDAs) and laptop computers, may initiate or otherwise transmit a signal at the designated frequency to the base station to initiate a call or data session and begin transmitting data.

Mobile networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, an evolution of Universal Mobile Telecommunications System (UMTS) referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical mobile service provider network, or "mobile network," includes a core packet-switched network, a transport network, and one or more radio access networks. The core packet-switched network for the mobile network establishes logical connections, known as bearers, among the many service nodes on a path between a wireless device, attached to one of the radio access networks, and a packet data network (PDN). The service nodes then utilize the bearers to transport subscriber traffic exchanged between the wireless device and the PDN, which may include, for example, the Internet, an enterprise intranet, a layer 3 VPN, and a service provider's private network. Various PDNs provide a variety of packet-based data services to wireless devices to enable the wireless devices to exchange service data with application or other servers of the PDNs. In addition, while primarily described with respect to service providers and mobile service provider networks, many different types of entities, including enterprises and government agencies, may deploy a mobile network. Accordingly, the term "mobile network" may be used herein to encompass many different types of cellular network architectures and operators.

Mobile networks perform detailed and accurate monitoring of service usage so that proper charging information can be generated for potentially millions of customers in order to provide revenue for the service providers. A mobile network gateway collects charging information related to the external data network usage and to network resource usage, such as the amount of data categorized by quality of service (QoS), the user protocols, and the usage of the packet data protocol (PDP) address. However, the amount and granularity of data that may be collected is typically limited by the capabilities of the mobile network gateway. In addition, the collected data is typically used to manage individual subscriber access (e.g., denying a subscriber access to the requested service in the absence of adequate credit).

SUMMARY

In general, techniques are described for providing a continuous feedback system that dynamically updates data collection criteria and subscriber policies based on aggregated subscriber-specific and network usage data. More specifically, an analytics system aggregates subscriber-specific and network usage data collected by a network gateway, generates, based on high-level business policies, updated data collection criteria that are not subscriber specific (i.e., subscriber unaware policies), and provides the updated data collection criteria to another network device that converts the subscriber unaware data collection criteria into subscriber aware (i.e., subscriber specific) policies, which are installed into the network gateway. In some examples, the analytics system provides the aggregated data to a software-defined network (SDN) controller. The SDN controller may determine, based on the aggregated data, that the network gateway needs to collect other data and that the network topology needs to be adjusted. Accordingly, the SDN may provide updated business policy information to the analytics system and may configure the network gateway and other network elements to adjust the network configuration. In this manner, techniques of this disclosure may enable a software-defined network to more efficiently utilize network resources to process network traffic, which may improve the quality of the end-user experience.

In one aspect, a method includes applying one or more subscriber specific policy and charging control rules to network traffic associated with a plurality of subscribers to collect network traffic data for the plurality of subscribers, aggregating the network traffic data collected for the plurality of subscribers into aggregated traffic data, and determining, based on the aggregated network traffic data, whether one or more subscriber independent data collection criteria for a network need to be updated. The method may also include, responsive to determining that the one or more subscriber independent data collection criteria need to be updated: updating, based on the aggregated network traffic data, the subscriber independent data collection criteria, the updated subscriber independent data collection criteria including subscriber matching criteria and traffic matching criteria, identifying one or more subscriber sessions that match one or more of the subscriber matching criteria, for each of the one or more identified subscriber sessions, generating updated subscriber specific policy and charging control rules that include at least a portion of the traffic matching criteria specific by the subscriber independent data collection criteria, and applying the updated subscriber specific policy and charging control rules to additional network traffic to collect additional network traffic data.

In another aspect, a network system includes a mobile network gateway, an analytics system, and a policy and charging rules function device. The mobile network gateway applies one or more subscriber specific policy and charging control rules to network traffic associated with a plurality of subscribers to collect network traffic data for the plurality of subscribers. The analytics system receives, from the mobile network gateway, the network traffic data for the plurality of subscribers, aggregates the network traffic data collected for the plurality of users into aggregated network traffic data, determines, based on the aggregated network traffic data, whether one or more subscriber independent data collection criteria for a network need to be updated, and, responsive to determining that the one or more subscriber independent data collection criteria need to be updated, updates, based on the aggregated network traffic data, the subscriber independent data collection criteria. The policy charging and rule function device translates the updated subscriber independent data collection criteria from updated subscriber independent data collection criteria into updated subscriber specific policy and charging control rules, wherein the mobile network gateway further applies the updated subscriber specific policy and charging control rules to additional network traffic to collect additional network traffic data.

In another aspect, a non-transitory computer-readable storage media is encoded with instructions that, when executed by one or more processors of a network device, cause the network device to receive, from a mobile network gateway, network traffic data for network traffic, the network traffic data including network traffic data for a plurality of subscribers, aggregate, based on one or more criteria, the network traffic data for the plurality of subscribers into aggregated network traffic data, and determine, based on the aggregated network traffic data, whether one or more subscriber independent data collection criteria for a network need to be updated. The instructions further cause the network device to, responsive to determining that the one or more subscriber independent data collection criteria need to be updated: update, based on the aggregated network traffic data, the subscriber independent data collection criteria to include a request for more granular information for at least a portion of the network traffic, provide the updated subscriber independent data collection criteria to a policy charging and rules function device that translates the updated subscriber independent data collection criteria from updated subscriber independent data collection criteria into updated subscriber specific policy and charging control rules, and receive additional network data for the portion of the network traffic specified in the updated subscriber independent data collection criteria.

The details of one or more embodiments are set forth in the accompanying drawings and the description below. Other features, objects, and advantages will be apparent from the description and drawings, and from the claims.

BRIEF DESCRIPTION OF DRAWINGS

FIG. 6 is a flowchart illustrating an example mode of operation of a network system using analytics based reporting according to techniques described in this disclosure.

Like reference characters denote like elements throughout the figures and text.

DETAILED DESCRIPTION

Figure 1:
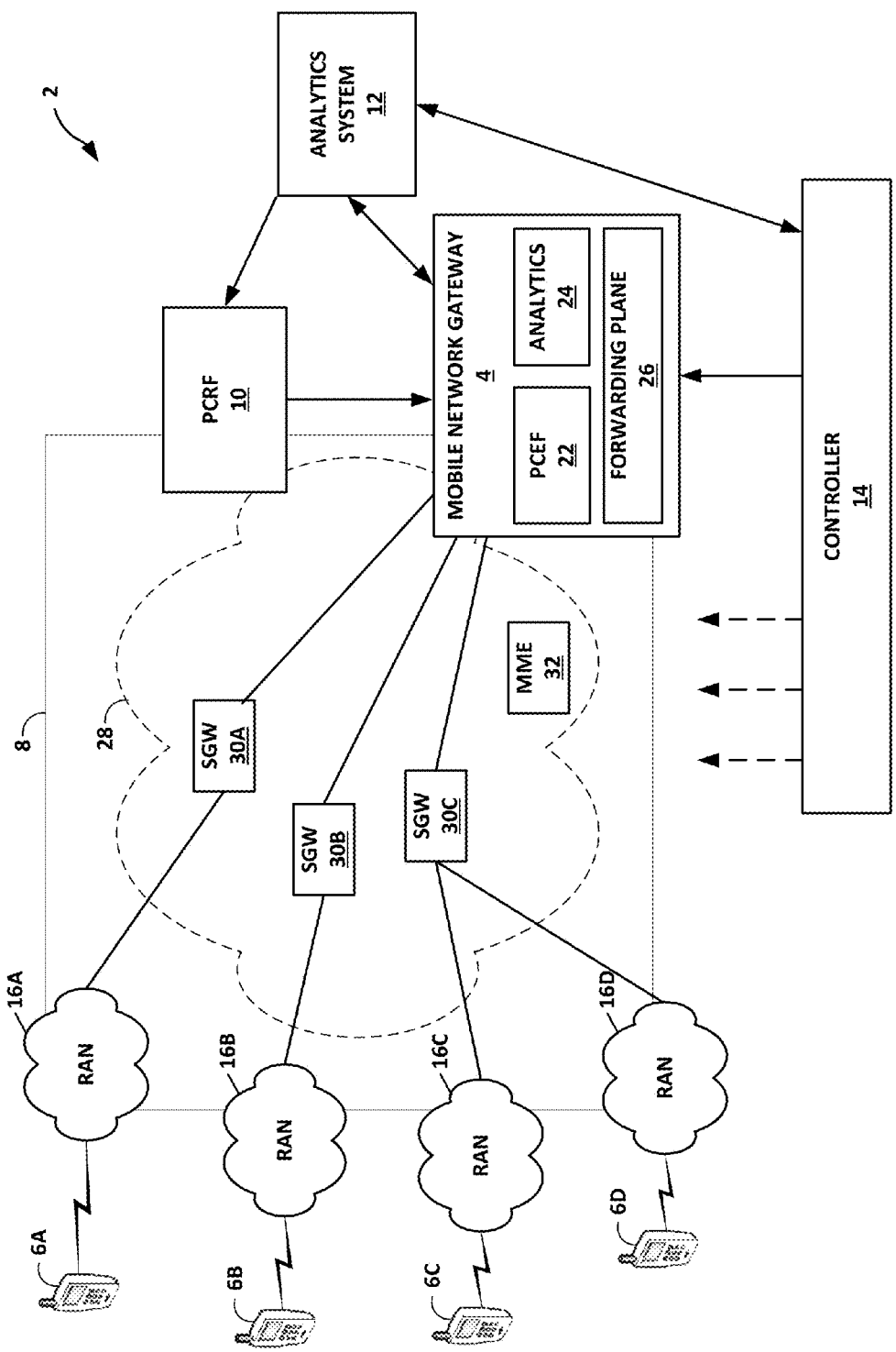
FIG. 1 is a block diagram illustrating an example network system in which an analytics system controls data collected by gateway devices according to techniques described in this disclosure.

FIG. 1 is a block diagram illustrating an example network system in which an analytics system controls data collected by gateway devices according to techniques described in this disclosure. In this example, network system 2 includes mobile network gateway 4, one or more wireless devices 6A-6D (collectively, "wireless devices 6"), connectivity access network 8, Policy and Charging Rules Function (PCRF) device 10, analytics system 12, and software-defined network (SDN) controller 14. While network system 2 is shown as a mobile network, the techniques described in this disclose are not limited to mobile network and may be applied to other types of networks, including wireline networks, wireless networks, and Wi-Fi networks. Further, while shown in FIG. 1 as distinct devices, PCRF 10 and analytics system 12 may, in some examples, be part of the same network device (e.g., both included within PCRF 10).

Although the example of FIG. 1 shows wireless devices 6 as mobile telephones, wireless devices 6 may comprise various other types of wireless communication devices. For example, wireless devices 6 may comprise laptop or desktop computers, netbooks, video game devices, pagers, smart phones, personal data assistants (PDAs), utility meters, security devices such as a motion detectors or door locks, wireless sensors, tablet computers, appliances, in-car computers, or other types of wireless communication devices. In various instances, wireless devices 6 may also be referred to as User Equipment (UE) or Mobile Stations (MS). Wireless devices 6 may run one or more applications, such as VoIP clients, video games, videoconferencing applications, e-mail applications, web browser applications, and/or other types of applications.

Each of wireless devices 6 is associated with a subscriber. In some instances, multiple wireless devices are associated with a single subscriber. A subscriber may be a person, a business organization, a governmental organization, a non-governmental organization, or another entity that subscribes to a service that enables wireless devices 6 to exchange data with one or more of the services. For example, a service provider may operate connectivity access network 8 to provide network access, data transport, and other services to wireless devices 6. In this example, the subscribers may subscribe to the services provided by the service provider.

Connectivity access network 8 delivers user traffic from wireless devices 6 to mobile network gateway 4 and delivers user traffic from mobile network gateway 4 to wireless devices 6. In various examples, connectivity access network 8 is implemented in various ways. For example, connectivity access network 8 may implement a cellular network architecture such as those defined by the Global System for Mobility (GSM) Association, the $3^{rd}$ Generation Partnership Project (3GPP), the Internet Engineering Task Force (IETF), the Worldwide Interoperability for Microwave Access (WiMAX) Forum, and other standards bodies. Example network architectures defined by the 3GPP include the General Packet Radio Service (GPRS) architecture, the Universal Mobile Telecommunications System (UMTS) architecture, the Enhanced Data Rates for GSM Evolution (EDGE) architecture, the Long Term Evolution (LTE) architecture, and the LTE Advanced architecture. Alternatively or in conjunction with one of the above, connectivity access network 8 may implement a Code Division Multiple Access-2000 ("CDMA2000") architecture. The WiMAX architecture is a cellular network architecture defined by the WiMAX Forum.

Connectivity access network 8 establishes and operates bearers to transport user traffic, in the form of PDP packet data units (PDUs), referred to hereinafter as "packets." In general, a bearer is a set of network resources and data transport functions in connectivity access network 8 that deliver user traffic between two network entities. A bearer may include a path, a logical connection, or a physical or wireless connection between two network devices. For example, a bearer may comprise an Evolved Packet System (EPS) bearer. Further details regarding bearer setup and management are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, and "3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each being incorporated herein by reference.

Content network 8 includes core network 28, which includes intermediate devices that implement the protocols of connectivity access network 8. Example type of intermediate devices in the core network 28 may include, but are not limited to, Serving GPRS Support Nodes (SGSNs) and Mobility Management Entities (MMEs). In the example of FIG. 1, core network 28 includes a plurality of Serving Gateways (SGWs) 30A-30C (collectively, "Serving Gateways 30" or "SGWs 30"), and MME 32

MME 32 is logically connected to SGWs 30. In some examples, MME 32 may, in addition to bearer management and establishment, host Non-Access Stratum (NAS) signaling, mobile network gateway 4 and SGW 30 selection, roaming, and authentication. In various examples, core network 28 includes different numbers of MMEs, SGWs, and/or PGWs. In different architectural examples of connectivity access network 8, such as a UTRAN network, SGSNs may perform the functionality of SGWs 30 and MME 32, and a GGSN may perform functionality of mobile network gateway 4 consistent with the techniques of this disclosure. While described with respect to a particular type of LTE node, i.e., a PGW, the techniques may be applicable to other types of core network gateways, including GGSNs, SGSNs, aGWs, and SGWs.

Each of radio access networks 16 may be a radio access network, which in various instances may be a GSM Radio Access Network (GRAN), a WiMAX radio access network, a UTRAN, and/or an evolution of a UTRAN for LTE networks known as an E-UTRAN. Each of radio access networks 16 may include one or more radio towers, which in the case of E-UTRANs are eNode Bs and in the case of UMTS radio access networks are Node Bs. In some examples, wireless devices 6 communicatively couple to radio access networks 16 using Uu interfaces operating over radio links.

Connectivity access network 8 may further include a backhaul or transport network (not shown) that includes land-based transmission lines, frequently leased by a service provider, to transport user and control traffic between wireless devices 6 and mobile network gateway 4. The backhaul network may also include network devices such as aggregation devices and routers. Further details of an example content access network for a mobile network are described in U.S. patent application Ser. No. 12/905,771, entitled "COLLECTIVELY ADDRESSING WIRELESS DEVICES," filed Oct. 15, 2010, the entire contents being incorporated herein by reference.

In the example of FIG. 1, mobile network gateway 4 is a network device that operates as a gateway to a packet data network. For example, mobile network gateway 4 may comprise a Gateway GPRS Serving Node (GGSN), an Access Gateway (aGW), a packet data network (PDN) Gateway (PGW), or another type of network device that may operate as a gateway between connectivity access network 8 and a packet data network. In some examples, mobile network gateway 4 is a router that executes routing protocols to identify routes through connectivity access network 8 or the packet data network to various destinations.

In the example of FIG. 1, mobile network gateway 4 includes Policy and Charging Enforcement Function (PCEF) element 22, analytics element 24, and forwarding plane 26. Forwarding plane 26 may include one or more forwarding units that may connect mobile network gateway 4 to a different communication link in connectivity access network 8 or a packet data network. Each of the forwarding units may include a general purpose microprocessor and supporting computing hardware including memory, and one or more packet forwarding engines (PFEs), which may take the form of a special-purpose network processor having customized internal logic for processing network packets. In one example, each of the PFEs may be implemented as one or more application-specific integrated circuits (ASICs) having high-speed internal memory. The forwarding units of forwarding plane 26 are described in more detail with respect to FIG. 4.

In some examples, mobile network gateway 4 includes or is connected to a traffic detection function (TDF) device that includes PCEF 22, analytics 24, and forwarding plane 26 and that performs techniques described herein with respect to the mobile network gateway 4. In general, a TDF performs application traffic detection and reporting of detected applications' traffic along with an application instance identifier and service data flow descriptions to the PCRF 10 (when the service data flow descriptions are deducible). Like the PCEF 22, a TDF receives rules from PCRF 10, known as Application Detection and Control (ADC) rules, which PCRF 10 may provide and activate by an Sd reference point. The TDF applies, to detected application traffic, enforcement actions such as gating, redirection, and bandwidth limiting. In some examples, TDF may be applied by a network device that is separate and distinct from mobile gateway 4, such as an intermediate service node.

As mentioned above, mobile network gateway 4 functions as a gateway between connectivity access network 8 and a packet data network. Thus, when wireless devices 6 send packets to the services available via the packet data network, connectivity access network 8 delivers the packets to mobile network gateway 4 and mobile network gateway 4 may forward the packets on the packet data network for delivery to the services. Likewise, when the services available via the packet data network send packets to wireless devices 6, the packet data network delivers the packets to mobile network gateway 4 and mobile network gateway 4 may forward the packets on connectivity access network 8 for delivery to wireless devices 6.

The packets received by mobile network gateway 4 are associated with subscriber sessions. Each subscriber session is a logical, authenticated connection for exchanging of data between an individual wireless device and a service provided via the packet data network. Because each of wireless devices 6 is associated with a subscriber, each of the subscriber sessions is associated with a subscriber.

In general, mobile network gateway 4 responds to session requests from SGWs 30. Each session request may include a wireless device identifier (e.g., an IMSI) for the wireless device 6 that initiated the request. The session requests may further include an APN that identifies a packet data network and may in some instances further identify a requested service (e.g., Internet, WAP, or multimedia messaging service (MMS)) provided by the packet data network. In other words, the APN is a logical name that determines the appropriate gateway (e.g., GGSN) for the wireless device and usable by mobile network gateway 4 to determine the services requested by the user or the address of an access point in an external packet network to which user packets from the wireless device should be forwarded.

After a wireless device 6 establishes a subscriber session with a service, a forwarding plane 26 of mobile network gateway 4 may receive a packet associated with the subscriber session. When forwarding plane 26 receives a packet that belongs to the subscriber session, a PFE of the forwarding unit performs a datapath operation on the packet. The PFE may perform various datapath operations on the packet depending on whether the forwarding unit anchors the subscriber session and depending on values in the session context information for the subscriber session. For example, if the forwarding unit does not anchor the subscriber session, the forwarding unit may perform a datapath operation that forwards the packet to the forwarding unit of mobile network gateway 4 that anchors the subscriber session. If the forwarding unit anchors the subscriber session, the PFE of the forwarding unit may perform a datapath operation that identifies and performs packet-processing operations with regard to the packet. The PFE may identify the packet processing operations to perform with regard to the packet based on the session context information for the subscriber session. The packet processing operations may include various operations. For example, one packet processing operation may involve identifying a next hop for the packet and forwarding the packet to the identified next hop.

Furthermore, the packet processing operations performed by the PFE may include updating one or more data transfer statistics stored in a memory of the PFE based on a quantity of data stored in the packet. In some examples, the data transfer statistic may indicate a quantity of data exchanged by the subscriber during the subscriber session so as to maintain an accurate (e.g., byte accurate) count of the amount of data transferred by the subscriber session. In such examples, the PFE may update the data transfer statistic by adding the quantity of data in the packet to the data transfer statistic. In this way, the PFEs within mobile network gateway 4 may support thousands or millions of concurrent subscribers and yet maintain accurate data transfer statistics on a per-subscriber basis.

PCEF 22 provides service data flow detection, user plane traffic handling, triggering control plane session management in some instances, QoS handling, and service data flow measurement as well as online and offline charging interactions with online charging server and offline charging server. In some examples, PCEF 22 is provisioned by Policy and Charging Rules Function (PCRF) server 10 with one or more Policy and Charging control (PCC) rules that each specify a set of information enabling the detection of a service data flow and providing policy control and/or charging control parameters. PCEF 22 then enforces service flow-based policy and charging control according to the PCC rules. Further details regarding policy and charging controls are found in "3GPP TS 23.203—Policy and Charging Control Architecture (Release 10)," Version 10.1.0, 3rd Generation Partnership Project, Technical Specification Group Services and System Aspects, September 2010; and 3GPP TS 29.212—Policy and Charging Control (PCC), Reference Points (Release 11)," Version 11.7.0, February 2012; as well as in U.S. patent application Ser. No. 12/947,463, filed Nov. 16, 2010, each of which are incorporated by reference herein in their entirety.

In general, PCRF 10 is used in 3GPP network for controlling the user experience on a per subscriber basis. PCRF 10 has access to the subscription information (e.g., stored to a subscriber profile repository (SPR)) and user equipment information. PCRF 10 maintains a per subscriber session with mobile network gateway 4 and has the capability of updating the session (e.g., based on push mechanism due to external triggers) or receive triggers (like user location, etc.), which trigger session updates. The PCRF uses a PCC rule construct in order to charge certain packet flows individually. The PCC rule contains a 'matching criteria' that can be an Internet Protocol (IP) 5 tuple or a layer-7 rule. The PCRF can be triggered to create PCC rules based on the external communication (e.g., an Rx interface is used by an IP multimedia subsystem to influence PCC rule creation.)

PCEF 22 may, in some examples, program forwarding plane 26 to collect additional information about the packets forwarded by mobile network gateway 4. For example, PCEF 22 may configure forwarding plane 26 to collect information about packets and packet flows on a per subscriber basis (i.e., using subscriber-specific rules). Forwarding plane 26 may collect application information associated with the packet, location information (e.g., geographic location information) associated with the mobile device that is the source or destination of the packet, service information associated with the packet, demographic information of the subscriber associated with the mobile device, and service provider information associated with the packet flow (e.g., video streaming from a particular website).

In some examples, analytics element 24, in addition to or instead of PCEF 22, may configure forwarding plane 26 to collect the desired information. In general, elements of forwarding plane 26 may apply deep-packet inspection (DPI) techniques to certain packets or forward certain packets to one or more service elements that apply DPI techniques to the packets in order to ascertain the desired information (e.g., application usage, subscriber behavior, etc.).

Forwarding plane 26 provides the collected information about the packets and packet flows to analytics element 24. Analytics element 24 may be a software or hardware module configured to perform various techniques described herein.

In instances where analytics element 24 is a software module, one or more processors of mobile network gateway 4 may execute analytics element 24. In general, analytics element 24 configures forwarding plane 26 or elements thereof to collect information about particular packets and/or packet flows on a per subscriber basis (e.g., using subscriber-specific rules), receives the collected information from forwarding plane 26, provides at least some of the collected information to analytics system 12, and receives updated data collection criteria from analytics system 12.

Analytics system 12 performs a combination of real time and non-real time analysis on the collected information received from mobile network gateway 4. For example, analytics system 12 may analyze the data received from network gateway device 4 based on the locations of subscribers, age group of subscribers, time of day, etc. As another example, analytics system 12 may analyze the data to identify subscriber usage patterns (e.g., device aware analytics), which may assist in long term planning of the network and service evolution. In addition, analytics system 12 may, based on the results of the analysis of the received data, alter the data being collected by, for example, changing the granularity of the data collection, targeting a certain set or subset of users for data collection, or limiting the data collection based on location or type of content.

In various instances, analytics system 12 may also provide results of the analysis to controller 14. For example, analytics system 12, based on the real-time network usage and user behavior data, may provide information to controller 14 regarding reallocation of network resources. Responsive to receiving the information from analytics system 12, controller 14 may send new rules to analytics system 12, install updated routing information within the access network, and/or cause an orchestrator to create new virtual machines for applications that are over-utilized or migrate existing virtual machines from applications that are under-utilized to applications that are over-utilized.

As shown in FIG. 1, controller 14 is a software-defined network controller (also referred to as an "application-driven network controller ('ADN')") that configures various network elements within network system 2. In general controller 14 is responsible for creation and modification of service paths, creation and deletion of services (e.g., using a virtual machine orchestrator) and management of the switches and routers in network system 2 through which the data flows.

In some instances, controller 14 receives topology information from network system 2. Controller 14 may, for example, utilize a software-defined networking (SDN) protocol to receive topology information from one or more of network device. One example of an SDN protocol is "OpenFlow," which is a communication protocol that provides direct access to the data plane of a network switch or router. In some instances, controller 14 may receive messages from various network devices in accordance with an SDN protocol. Further example details of the OpenFlow protocol is described in "OpenFlow Switch Specification," Open Networking Foundation, Version 1.2, Dec. 5, 2011, incorporated herein by reference.

Controller 14 may configure elements of network system 2 based on the analytics received from analytics system 12. For example, controller 14 may change the topology of network system 2 by altering the resources available within network system 2. Controller 14 may cause one or more virtual servers to initialize and begin executing in order to handle an increased load of a certain type of network traffic. Controller 14 may also cause one or more other virtual servers to shut down in response to determining that there is excess capacity in network system 2 for processing a certain type of data. In addition, controller 14 may reroute network traffic to alternate sites for servicing. Further, controller 14 may use location of congestion and application usage data to modify the spectrum strategy by allocating video favorable spectrum or additional radio resources in appropriate cell sites, changing the power of transmission. In various instances, controller 14 may also update data collection criteria based on the analysis received from analytics system 12. In this manner, controller 14 may update the data collection criteria and/or topology in an attempt to optimize the utilization of network resources.

Controller 14 provides the updated data collection criteria to analytics system 12. Analytics system 12 may adjust the granularity of the data being collected by mobile network gateway 4 by, for example, limiting the data collection to data aggregated over multiple target subscribers. For example, if analytics system 12 determines that additional data should be collected about of video traffic being generated within a geographic region, analytics system 12 can configure (indirectly or directly) mobile network device 4 to aggregate the data for all subscribers based in the geographic region. Similarly, analytics system 12 may configure mobile network gateway 4 to collect data for packets having a particular to application or type of data (e.g., video streaming). Analytics system 12 can to adjust the data being collected based on feedback received from controller 14 and the analytics generated by analytics system 12 when analyzing the data collected by mobile network gateway 4. Analytics system 12 may change the data collected based on subscriber type, reporting interval, and current state of the subscriber (e.g., location, time zone, radio access technology type, etc.). As another example, analytics system 12 may configure mobile network gateway 4 to collect data for packets having a particular radio access technology type. Based on the updated network traffic data collected for the particular radio access technology type, controller 14 may allocate additional radio resources at one or more cell sites identified as being congested cell sites.

Analytics system 12 configures mobile network gateway 4 by, for example, providing data collection information to PCRF 10 using a rule construct. More specifically, analytics system 12 may provide rules to PCRF 10 that specify subscriber criteria and traffic matching criteria for which mobile network gateway 4 should collect data. PCRF 10 translates this higher level, subscriber independent data collection criteria into subscriber-specific rules for actual subscriber sessions in order configure mobile network gateway 4. The subscriber-specific rules include the traffic matching criteria and reflect the subscriber independent data collection criteria included in the rules provided by analytics system 12.

In this manner, techniques of this disclosure may enable network system 2 to create a virtuous circle or feedback loop in which a stream of real-time information on performance, application usage trends, user behavior, congestion events, device trends and much else besides is fed back to controller 14 and to the various network and consumer applications connected to it. Using high-level business policies and related tools (e.g., optimization software), techniques of this disclosure may enable network system 2 to continually adjust to current network conditions, optimizing both the efficiency with which resources are consumed and the quality of the end-user experience.

Figure 2:
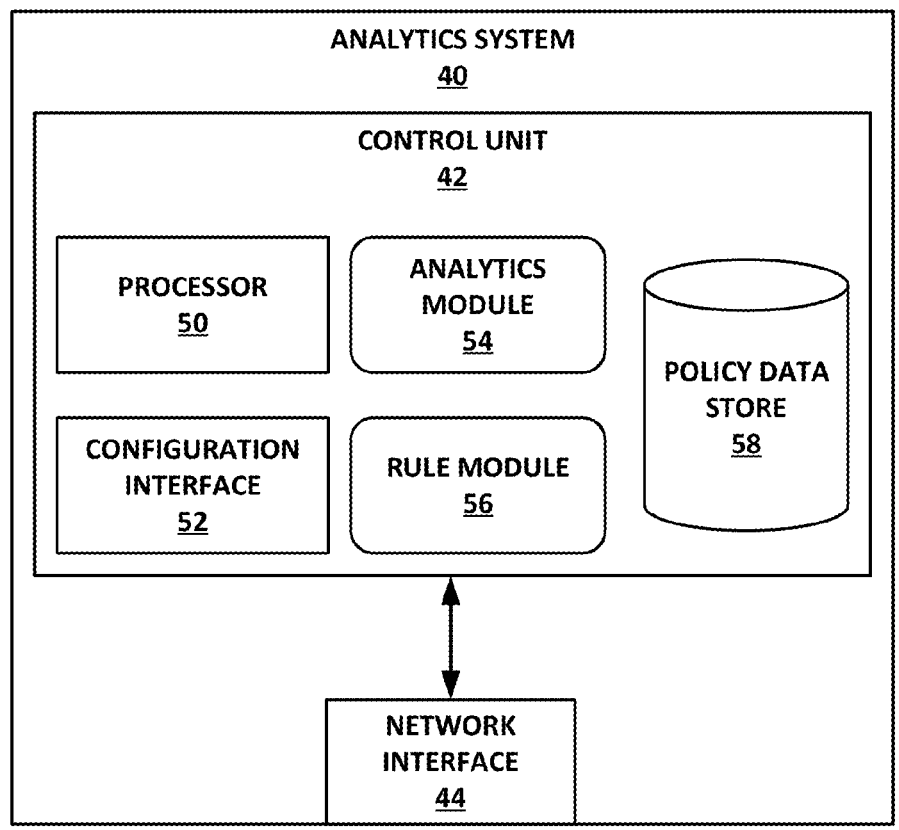
FIG. 2 is a block diagram illustrating an example analytics system according to techniques described in this disclosure.

FIG. 2 is a block diagram illustrating an example analytics system according to techniques described in this disclosure. Analytics system 40 may represent an example instance of analytics system 12 of FIG. 1. As shown in FIG. 2, analytics system 40 includes control unit 42 and network interface 44. Control unit 42 includes one or more processors 40 that execute software instructions, such as those used to define a software or computer program, stored to a tangible computer-readable medium, such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 70 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware.

Control unit 42 provides an operating environment for configuration interface 52, analytics module 54, and rule module 56. In addition, control unit 42 may include a tangible computer-readable medium for storing policy data store 58. Configuration interface 52 of control unit 50 provides an interface by which a network management system, a SDN controller (e.g., controller 14 of FIG. 1), or in some instances an administrator, configures analytics system 40 and sets policy data store 58 to install business policies, data collection criteria, and other configuration data to control the operation of analytics system 40. Configuration interface 52 may include a command line and/or graphical user interface (CLI or GUI) or execute a device management protocol such as NETCONF or Simple Network Management Protocol (SNMP), for instance, to request and set configuration information. Analytics system 40 may implement configuration information using a management information base (MIB).

Analytics module 54 may analyze the traffic data received from network gateway device 4 (e.g., via network interface 44). Analytics module 54 may aggregate the data based on location, application, device type, radio access technology, time of day, subscriber, etc. to identify usage patterns and network traffic patterns. For example, analytics module 54 may analyze the data to determine applications used by a particular group of subscribers or bandwidth used by a certain group of application. As another example, analytics module 54 may analyze the data based on device type to identify usage patterns for subscribers using particular devices (e.g., a particular smartphone model, non-smartphones, etc.).

In various instances, analytics system 40 provides the results of the analysis to controller 14. Controller 14 may include or provide the functionality of a policy server and/or a virtual machine orchestrator. Responsive to receiving the result of the analysis from analytics system 40, controller 14 determine whether any changes need to be made to the network policies and network topology. For any changes to the network policies, controller 14 sends the updated network policies to analytics system 40, which stores the updated network policies using policy data store 58.

For any changes to the network topology, controller 14 may configure network devices throughout the network and may create or reconfigure various virtual machines to adjust the allocation of resources such that each service has an appropriate amount of resources. As one example, controller 14 may combine the analytics received from analytics system 40 with radio access network congestion information to modify the network and quality of service strategy of the network. For example, controller 14 may determine that video services are overload (i.e., that one or more network resources providing the video services are overloaded). Responsive to determining that one or more virtual machines providing a type of service are overloaded, controller 14 may cause more video optimization virtual machines to be created and may configure the video optimization virtual machines to downgrade the frame rate of the videos for a certain group of subscribers. Further, controller 14 may update routing information to cause at least a portion of the network traffic to be serviced by the newly created or reconfigured virtual machines. As another example, controller 14 may identify, based on network traffic data aggregated by radio access technology type and geographic location, one or more congested cell sites and allocate additional radio resources at the one or more congested cell sites.

Analytics module 54 may retrieve network policies from policy data store 58 (i.e., the updated network policies received from controller 14) and, based on the retrieved network policies and the results of the analysis, determine that mobile network gateway 4 should collect more granular (i.e., more specific) information on the network traffic. The additional information being collected may be limited to a particular geographic region, a particular application, a particular set of subscribers, a particular time of day, etc. or any combination thereof. The network policies may reflect subscriber independent high-level business policies for a service provider. That is, the network policies received from controller 14 and stored using policy data store 58 are not subscriber specific policies. Rather, the network policies reflect high-level business goals for the service provider, such as quality of service policies, security policies, etc.

Responsive to analytic module 54 determining that mobile network gateway 4 should collect more specific information on the network traffic, rule module 56 may retrieve network policy information from policy data store 58, including any updated network policy information received from controller 14. Using the retrieved network policy information, rule module 56 determines any changes that need to be made to the data being collected by mobile network gateway 4 and generates updated data collection criteria reflecting those changes.

In general, the data collection criteria generated by rule module 56 specify various subscriber criteria (e.g., geographic location, radio access technology type, etc.) and traffic matching criteria for which mobile network gateway 4 should collect data. The data collection criteria are subscriber independent criteria. In one example, the data collection criteria are specified using the Diameter protocol data format and may be included within new attribute-value pairs (AVPs). The AVPs may include an analytics key and a reporting time. The analytics key includes the reference to the type of analytics information data mobile network gateway 4 should collect and may be shared across many different subscribers. The reporting time indicates the time after which mobile network gateway 4 should report the data back to analytics system 40 (e.g., five seconds, twenty seconds, three minutes, one hour, etc.). Further example details of the Diameter protocol is described in "Diameter Base Protocol," RFC 6733, October 2012, by Fajardo, et al., incorporated herein by reference. In some cases, the rules are specified according to Remote Authentication Dial-In User Server (RADIUS) or other Authentication, Authorization, and Accounting protocol or using extensible markup language (XML).

In order to configure mobile network gateway 4, analytics system 40 may provide the generated data collection criteria to PCRF 10 and at least some information corresponding to the generated data collection criteria to network access gateway 4. Analytics element 24 of mobile network gateway 4 processes the information received from analytics system 40 and may install triggers (e.g., reporting triggers) into forwarding plane 26 to cause forwarding plane 26 to provide analytics element 24 with the requested data at the specified reporting interval. Examples describing how PCRF 10 processes the rules are described in more detail with respect to FIG. 3.

Figure 3:
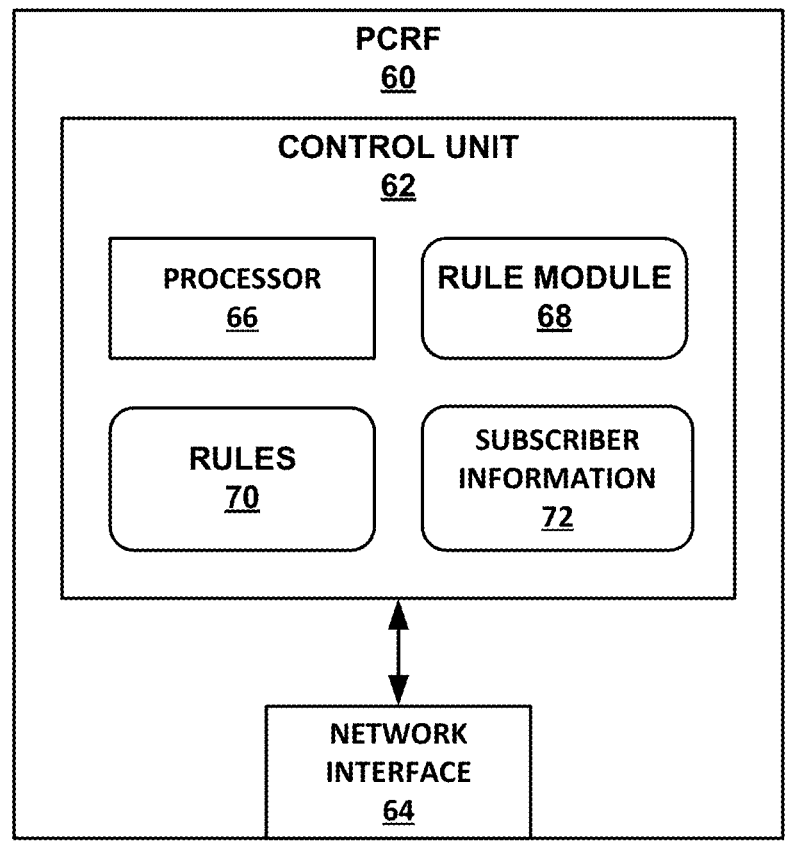
FIG. 3 is a block diagram illustration an example PCRF that generate subscriber-specific rules from subscriber independent data collection criteria according to techniques described in this disclosure.

FIG. 3 is a block diagram illustration an example PCRF that generate subscriber-specific rules from subscriber independent data collection criteria according to techniques described in this disclosure. PCRF 60 may represent an example instance of PCRF 10 of FIG. 1. Control unit 62 includes one or more processor(s) 66 that execute software instructions, such as those used to define a software or computer program, stored to a tangible computer-readable medium (not shown in FIG. 3), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 70 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware.

Control unit 62 of PCRF 60 provides an operating environment for rule module 68 to manage and provide policy and charging control (PCC) rules 70 (illustrated as "rules 70") and PCC rule metadata to PCEF 22 of mobile network gateway 4 in accordance with the described techniques. Rule module 68 determines, for various services, the manner in which corresponding service data flows shall be treated with respect to, e.g., QoS and charging by PCEF 22. Rule module 68 performs session binding to generate PCC rules 70 that direct PCEF 22 bearer binding, charging, reporting, credit management, and event triggering.

Each of PCC rules 70 comprises a 32-bit precedence value, for example, and a service data flow template that comprises one or more service data flow filters that include parameters with which to match packets. In addition, rule module 68 may add or remove individual PCC rules 70 for an ongoing session. Service data flow filter parameters may include an IP 5-tuple and or DPI parameters. PCC rules 70 may comprise an associative data structure to map sets of PCC rules to individual sessions for wireless devices, including a wireless device 6. Such sessions may comprise IP-CAN sessions. Rule module 68 issues one or more PCC rule installation messages to PCEF 22 to install the PCC rules to PCEF 22. Rule module 68 provides additional PCC rule installation messages to PCEF 22 upon modifications to one or more of PCC rules 70 to ensure PCC rules stored at PCEF 22 include up-to-date policy control information and service data flow detection information.

In generating PCC rules 70, rules module 68 parses the data collection criteria received from analytics system 12 (e.g., via network interface 64). The data collection criteria received from analytics system 12 include a reporting time trigger and a reference to a type of analytics information data being collected by mobile network gateway 4. That is, PCRF 60 receives information regarding the criteria of matching traffic from analytics system 12. The criteria may include subscriber matching information (e.g., location, type of subscriber, device type, etc.) and traffic matching information (e.g., application-ID, L3/L4 rules, etc.). PCC rules 70 generated by rules module 68 reflect the subscriber matching and traffic matching information. For example, PCC rules 70 include rules to collect network traffic information for the particular subscribers and particular network traffic that matches the subscriber and traffic matching information.

Rules module 68 retrieves information about active subscribers from subscriber information 72 and identifies any active subscribers that correspond to the subscriber matching information. For the identified active subscribers, rules module 68 generates subscriber-specific rules that include the network traffic matching information such that, when the rule is installed at mobile network gateway 4, mobile network gateway 4 records network traffic information that matches the network traffic matching information and the identified active subscriber. PCRF 60 installs PCC rule 70 into PCEF 22 of mobile network gateway 4. In this manner, PCRF 60 transforms high-level, subscriber independent data collection criteria into subscriber-specific rules.

Figure 4:
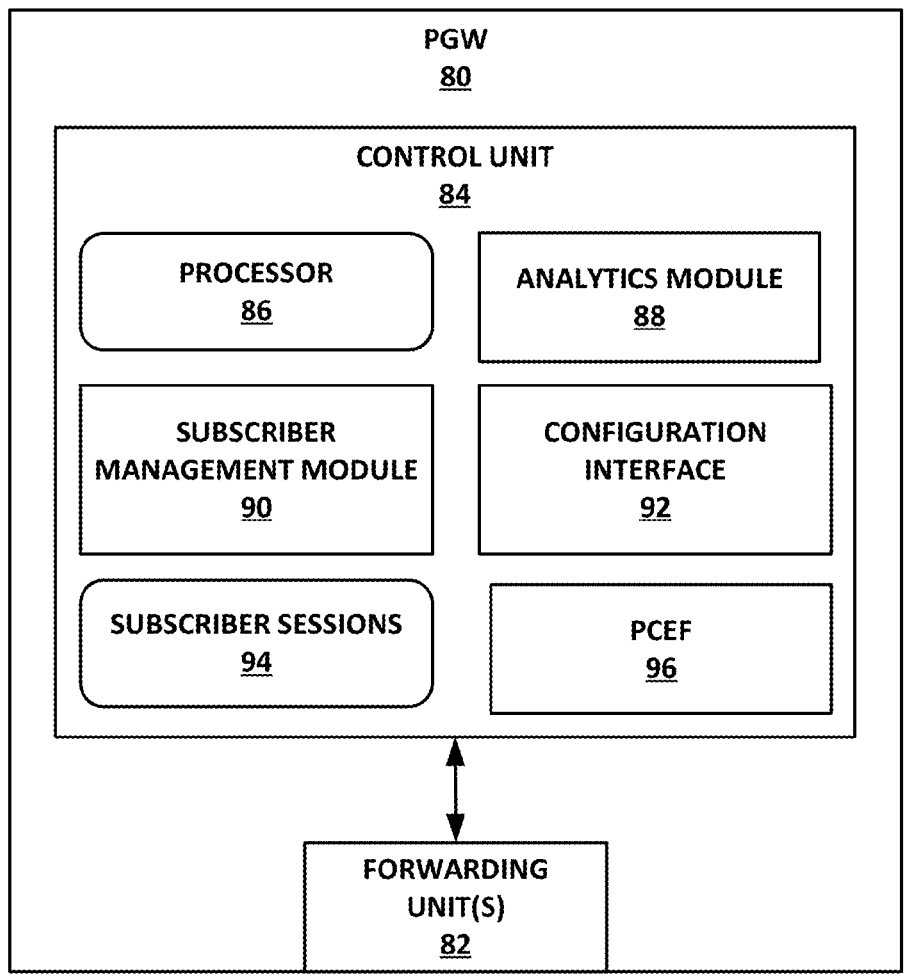
FIG. 4 is a block diagram illustrating an example mobile network gateway that collects data on a per subscriber basis according to techniques described in this disclosure.

FIG. 4 is a block diagram illustrating an example mobile network gateway that collects data on a per subscriber basis according to techniques described in this disclosure. PGW 80 may represent an example instance of mobile network gateway 4 of FIG. 1. Control unit 84 includes one or more processor(s) 86 that execute software instructions, such as those used to define a software or computer program, stored to a tangible computer-readable medium (not shown in FIG. 4), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 84 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware.

Control unit 84 of PGW 80 provides an operating environment for analytics module 88, subscriber management module 90, configuration interface 92, and PCEF 96. In general, analytics module 88 manages the flow of network traffic data and data collection criteria between PGW 80 and analytics system 12. As one example, analytics module 88 receives network traffic data from forwarding units 82 and provides the network traffic data to analytics system 12. Prior to sending to analytics system 12, analytics module 88 may aggregate the network traffic data based on a characteristic of the network traffic data, such as geographic region, time of day, application type, device type, radio access technology type, etc.

Analytics module 88 may also receive information from analytics system 12. For example, when PGW 80 boots up, analytic module 88 may request analytics information from analytics system 12. The analytics information may include analytics keys (e.g., a reference to the type of analytics information data being collected) and reporting timers. Based on the received analytics information, analytics module 88 may install reporting triggers into one or more forwarding units 82. The reporting triggers cause forwarding units 82 to collect the requested network traffic data and provide analytics module 88 with the information at a defined reporting schedule that is specified by the reporting timer portion of the analytics information received from analytics system 12.

The analytics information may be shared across multiple subscribers. Rather than collecting and reporting network traffic data on a per subscriber basis, analytics module 88 may aggregate the network traffic data received from forwarding units 82 and report only the data aggregated across all subscribers to analytics system 12. For example, if multiple subscribers are using application A within a particular geographic region and the analytics information requests information about application A usage within the particular geographic region, analytics module 88 aggregates the network traffic data for all of the subscribers using application A within the particular geographic region and sends the aggregated data to analytics system 12.

In some examples, the analytics information may include multiple different traffic matching criteria for the same set of subscribers. For example, the analytics information may request information about all subscribers within a geographic region as well as information about subscribers running a particular version of a mobile operating system within the geographic region. In this example, the network traffic data collected by forwarding units 82 for the subscribers in the geographic region would be used both in providing the aggregate data report for network traffic data for all subscribers in the geographic region and again for providing the aggregated data report for network traffic data for the subscriber within the geographic region who are using the particular version of the mobile operating system. In this manner, analytics module 88 may, for overlapping analytics criteria, process the data collected by forwarding unit 82 into multiple different aggregated network traffic data reports that are send to analytics system 12.

PCEF 96 enforces service flow-based policy and charging control according to the PCC rules, including collecting traffic information for the particular subscribers and traffic that matches the subscriber and traffic matching information provided by analytics system 12 to PCRF 10 and on which the PCC rules are based. In some examples, PCEF 96 applies the PCC rules generated to enforce conventional charging and control functions as well as those PCC rules generated to trigger enhanced network traffic data collection according to techniques of this disclosure.

Either analytics module 88 or PCEF 96 may cause forwarding units to collect network traffic data as specified by analytics system 12. As one example, analytics module 88 may receive analytics information directly from analytics system 12 and configure forwarding units 82 to collect the requested network traffic data. As another example, PCRF 10 may provide PCC rules to PCEF 96 and PCEF 96 may configure forwarding units 82 to collect the requested network traffic data.

Subscriber management module 90 establishes one or more subscriber sessions 94 for a mobile network served by PGW 80 and manages the subscriber sessions once established. Subscriber management module 90 may store session data, received in control plane protocol messages received by PGW 80 or allocated by subscriber management module 90, for one or more subscriber sessions 94 in corresponding session contexts (also referred to as PDP contexts, not shown)). A session context stored for a subscriber session may include, for example, the PDP address allocated by the mobile network for the wireless device for use in sending and receiving user packets, routing information such as tunnel endpoint identifiers (TEIDs) and identifiers/addresses for downstream nodes, the APN for the session, and quality of service (QoS) profiles. In some examples, functional aspects of control unit 84 are performed by a decentralized architecture or one or more services cards or "subscriber management service units." As a result, PGW 80 may achieve increased scalability to handle thousands or millions of concurrent communication sessions from mobile devices. Additional details regarding subscriber management are found in U.S. patent application Ser. No. 13/172,556, filed Jun. 29, 2011 and entitled "MOBILE NETWORK GATEWAY HAVING DECENTRALIZED CONTROL PLANE FOR ANCHORING SUBSCRIBER SESSIONS," which is incorporated by reference herein in its entirety.

Forwarding unit 82 represents a forwarding plane of PGW 80 and may include one or more network interfaces and forwarding components for forwarding service data traffic. PGW 80 may also, in some examples, include a distributed forwarding plane. Subscriber management module 90 may install forwarding information to forwarding unit 82 for processing and forwarding data traffic from the mobile devices. Forwarding unit 82, for instance, receives user packets, maps the user packets to a session context of subscriber sessions 94, and applies forwarding information to forward the user packets according to the session context data. For example, forwarding of downstream user packets by forwarding unit 82 for a particular subscriber session may include encapsulating the user packets using the GPRS Tunneling Protocol (GTP) and setting the specified downstream TEID for the session within a GTP header. Forwarding unit 82 may perform aspects of PCEF 96 for subscriber sessions 94 to permit high-speed credit control and data collection. Example details on subscriber management module 90 constructing subscriber-specific forwarding paths within forwarding unit 82 can be found in U.S. patent application Ser. No. 13/172,505, filed Jun. 29, 2011 and entitled "VARIABLE-BASED FORWARDING PATH CONSTRUCTION FOR PACKET PROCESSING WITHIN A NETWORK DEVICE," the entire contents being incorporated herein by reference.

Configuration interface 92 of control unit 84 by which a network management system, a PCRF, or in some instances an administrator, sets configuration information to install subscription information, static PCC rules, and other configuration data to control the operation of PGW 80 with respect to subscriber sessions 94. Configuration interface 92 may include a command line and/or graphical user interface (CLI or GUI) or execute a device management protocol such as NETCONF or Simple Network Management Protocol (SNMP), for instance, to request and set configuration information. PGW 80 may implement configuration information using a management information base (MIB).

Configuration information may include charging profiles, trigger profiles, and rating groups. PGW 80 associated a particular one of charging profiles with a subscriber upon or as part of establishing a bearer to transport service data traffic for services used by the subscriber. Each of the charging profiles specifies the charging behavior to apply according to charging characteristics of subscriber. Charging behavior includes the charging mechanism (e.g., offline/online/both/none), charging information sets, and charging transport behavior.

Each of the charging profiles may be associated with one or more trigger profiles, each of which defines effective charging events that trigger charging data record creation and container addition or closure. In addition, the trigger profiles may each specify triggers including indicia of a change in charging conditions or bearer information for which PCEF 96 should ignore upon receipt (e.g., a change in time zone or QoS for a subscriber device). The trigger profiles may further specify credit control error conditions and corresponding handling actions for various credit control errors. In some cases, a charging profile may be selected for a subscriber according to a subscriber priority such that different priorities are accorded different charging control actions for actionable events. In some cases, a charging profile may be selected for a subscriber according to other factors, such as Radio Access Technology (RAT) for the subscriber device, or an International Mobile Subscriber Identifier (IMSI) or International Mobile Equipment Identifier (IMSI) range into which the subscriber/subscriber device falls.

Figure 5:
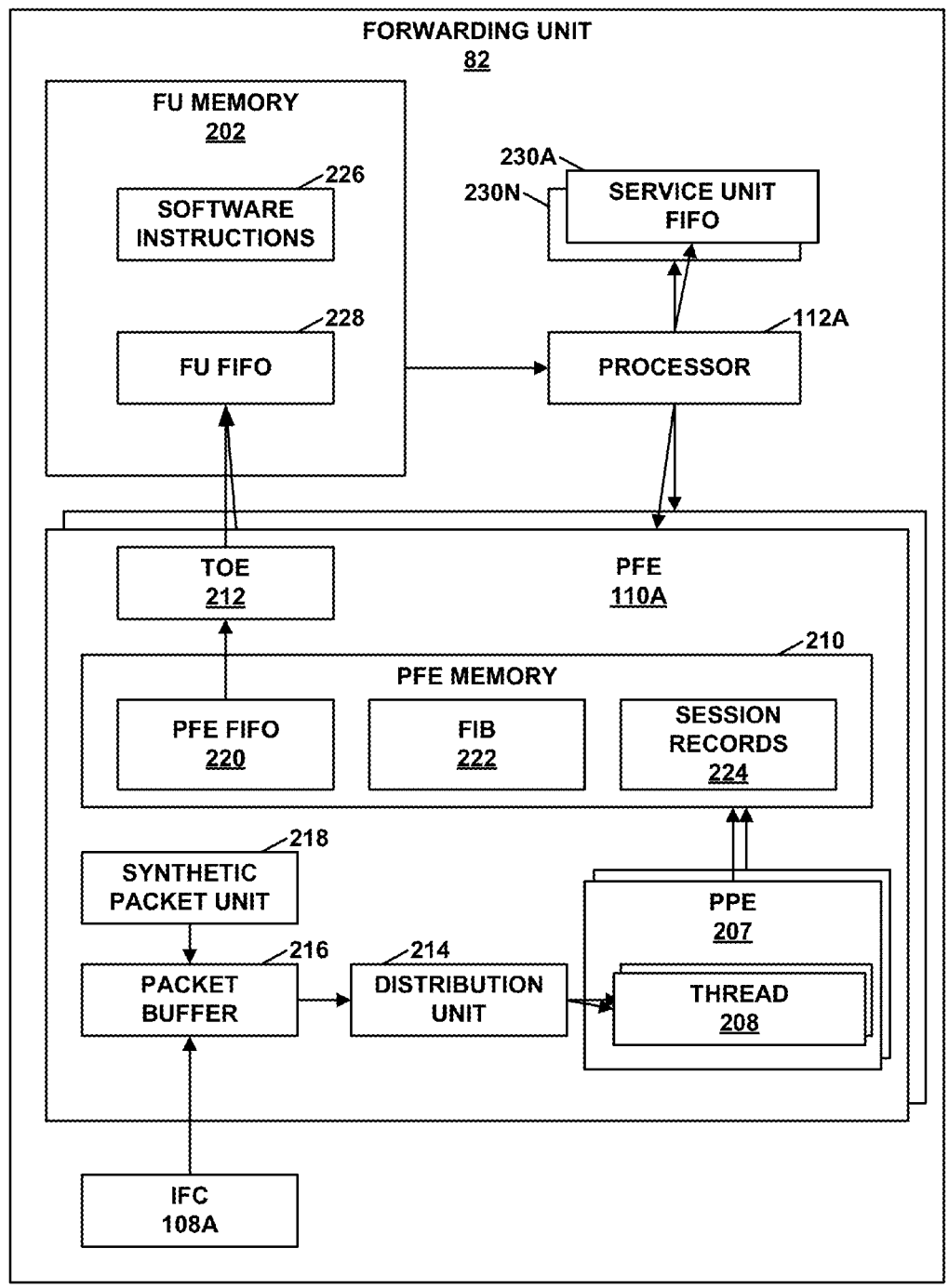
FIG. 5 is a block diagram illustrating an example forwarding unit of the mobile network gateway according to techniques described in this disclosure.

FIG. 5 is a block diagram illustrating an example forwarding unit of the mobile network gateway according to techniques described in this disclosure. As illustrated in the example of FIG. 5, forwarding unit 82 comprises a plurality of PFEs 110, a forwarding unit (FU) memory 202, a processor 112A, and a plurality of service unit FIFOs 230. In various examples, forwarding unit 82 may comprise various numbers of PFEs. For example, forwarding unit 82 may comprise four PFEs 110. In other examples, forwarding unit 82 may comprise more or fewer than four PFEs. Although FIG. 4 shows service unit FIFOs 230 as being outside of FU memory 202, in some examples, FU memory 202 stores service unit FIFOs 230.

Furthermore, as illustrated in the example of FIG. 5, PFE 110A may be a specialized packet processor having a multi-core architecture that includes an internal PFE memory 210 and hardware logic implementing a plurality of packet processing engines (PPEs) 207, a traffic offload engine (TOE) 212, a distribution unit 214, a packet buffer 216, and a synthetic packet unit 218. Each of PFEs 207 may provide a plurality of threads 208. Although not illustrated in the example of FIG. 5 for the sake of clarity, each of PFEs 110 may include corresponding threads, memories, TOEs, packet buffers, and synthetic packet units. In some examples, PFEs 110 may comprise more, fewer, or different components than those shown in the example of FIG. 5. For instance, in some examples PFEs 110 do not include synthetic packet units. In such examples, a single synthetic packet unit in forwarding unit 82 or elsewhere may provide the functionality of synthetic packet unit 218.

In the example of FIG. 5, internal PFE memory 210 stores a PFE FIFO 220, a forwarding information base (FIB) 222, and session records 224. In some examples, PFE memory 210 may store data in addition to PFE FIFO 220, FIB 222, and session records 224. In various examples, PFE memory 210 is implemented in various ways. For example, PFE memory 210 may a plurality of different memory units. In this example, different memory units of PFE memory 210 may store PFE FIFO 220, FIB 222, and session records 224. In other examples, a single memory unit of PFE memory 210 may store one or more of PFE FIFO 220, FIB 222, and session records 224.

Session records 224 are programmed within PFE 110A via processor 112A and contain data regarding subscriber sessions. For example, each of session records 224 may store a PDP address of a wireless device, forwarding information, an APN for a service provided via a packet data network, and other data regarding subscriber sessions. In addition, each of session records 224 stores charging information regarding a subscriber session. The charging information contains data related to charging subscribers for exchanging data over connectivity access network 8. For instance, the charging information in records includes data transfer statistics regarding the data exchanged by the subscribers during subscriber sessions.

In some examples, each of session records 224 includes a plurality of variable pairs. Each of the variable pairs specifies an identifier of a variable and a value for the variable. Each of the variables specifies a different piece of data regarding a subscriber session. For example, each of session records 224 may include a variable pair that includes an identifier of a data transfer statistic and a value that indicates a quantity of subscriber traffic transferred during the subscriber session associated with the session record.

Each of PPEs 207 may comprise hardware configured to execute threads 208. For instance, PPEs 207 may comprise specialized or general purpose integrated circuits for executing threads 208. In various examples, PFE 110A may comprise various numbers of PPEs 207. For example, PFE 110A may comprise sixteen PPEs. In various examples, PPEs 207 may comprise various numbers of threads 208. For example, each of PPEs 207 may comprise twenty threads. Thus, in this example, if PFE 110A comprises sixteen PPEs, forwarding unit 16A comprises 320 threads. In other examples, each of PPEs 207 may comprise more or fewer than twenty threads. In various examples, threads 208 may be implemented in various ways. For example, threads 208 may be implemented in microcode. In other examples, threads 208 may be implemented in higher level code.

Processor 112A comprises one or more integrated circuits to execute software instructions. In various examples, processor 112A is implemented in various ways. For example, processor 112A may be implemented as one or more general-purpose processors or special-purpose processors, such as DSPs, ASICs, FPGAs, etc.

Processor 112A is coupled to FU memory 202 such that processor 112A is able to read data from and write data to FU memory 202. As illustrated in the example of FIG. 4, FU memory 202 stores a set of software instructions 226 and a forwarding unit (FU) FIFO 228. In some examples, software instructions 226 include microkernel instructions and user-level software instructions. Execution of the microkernel instructions by processor 112A causes processor 112A to provide a microkernel. The microkernel may provide a basic set of operating system services. Processor 112A may also execute the user-level software instructions to provide user-level software processes that utilize the operating system services of the microkernel. In various examples, the user-level software processes executing on processor 112A may perform various tasks. For example, the user-level software processes executing on processor 112A may configure PFEs 110, offload data transfer statistics from FU memory 202 to service units, and perform other tasks.

When IFC 108A receives a packet from connectivity access network 8 or packet data network 10, IFC 108A provides the packet to one of PFEs 110. For ease of explanation, this disclosure assumes that IFC 108A provides the packet to PFE 110A. When PFE 110A receives the packet, packet buffer 216 may temporarily store the packet. Subsequently, distribution unit 214 assigns the packet to one of threads 208. For ease of explanation, this disclosure assumes that distribution unit 214 assigns the packet to thread 208A.

When distribution unit 214 assigns the packet to thread 208A, thread 208A may perform a datapath operation on the packet. In various examples, thread 208A may perform various datapath operations on the packet. When thread 208A performs the datapath operation on the packet, thread 208A may attempt to identify a subscriber session associated with the packet. In various examples, thread 208A may attempt to identify a subscriber session associated with the packet in various ways. For example, each of session records 224 may be associated with a hash value. In this example, PFE 110A may comprise a hash engine that generates a hash value for the packet at least in part by executing a hash function on one or more elements of the packet. For instance, the hash engine may execute a hash function such as SHA-1 or MD5 on elements of the packet such as the source and destination addresses of the packet, port numbers specified by the packet, and so on. Thread 208A may then determine whether the hash value for the packet matches the hash value of a session record. If there is a match, the packet is associated with the subscriber session associated with the session record.

If thread 208A successfully identifies the subscriber session associated with the packet, thread 208A may perform one or more packet processing operations specified by the session record for the subscriber session. Different session records may specify different packet processing operations. For example, one or more of session records 224 may specify that a QoS operation is to be applied to the packet. In another example, one or more of session records 224 may specify that an operation to facilitate lawful intercept of the packet is to be performed on the packet.

Furthermore, the packet processing operations may include updating the identified session record such that the session record indicates an up-to-date data transfer statistic regarding the data exchanged by the subscriber. For example, the packet processing operations may include updating the data transfer statistic to indicate the current quantity of data exchanged by the subscriber over connectivity access network 8 during the subscriber session. In this example, thread 208A may update the data transfer statistic by adding the quantity of data in the packet to the quantity of data indicated by the data transfer statistic.

Synthetic packet unit 218 provides synthetic packets to PFE 110A on a recurring basis. For example, the recurring basis may be a periodic basis with an interval of less than five seconds. For instance, synthetic packet unit 218 may provide a synthetic packet to PFE 110A every one or two seconds. In some examples, the synthetic packets have a packet type that is different than the packet types of packets received from connectivity access network 8 or a packet data network.

In response to receiving a synthetic packet, one of threads 208 at PFE 110A may perform a callout operation. When the thread performs the callout operation, the thread may iterate through session records 224. As the thread iterates through session records 224, the thread identifies ones of session records 224 that specify data transfer statistics that exceed a threshold. The thread may add the identified session records to PFE FIFO 220. Thus, the callout operation may add a session record to PFE FIFO 220 if the data transfer statistic exceeds a threshold, but does not add the session record to PFE FIFO 220 if the data transfer statistic does not exceed the threshold. Because the session records contain data transfer statistics, the thread effectively adds a data transfer statistic to PFE FIFO 220 if the data transfer statistic exceeds a threshold, and does not add the data transfer statistic to PFE FIFO 220 if the data transfer statistic does not exceed the threshold.

In various examples, the threshold may have a variety of values. For example, when one of the service units establishes a subscriber session, the service unit may configure the data transfer statistic to indicate a quantity of data that a subscriber has already transferred over connectivity access network 8 during a billing period. In this example, PFE 110A may increase the data transfer statistic based on the quantity of data in each packet in the subscriber session. Furthermore, in this example, the threshold may be a quantity of data, such as four gigabytes, allowed by the subscriber's service plan. In another example, subscribers may receive data transfer quotas. In this example, the data transfer statistic may indicate a quantity of data remaining in the data transfer quota. In this example, the callout operation may determine that the data transfer statistic exceeds the threshold when the data transfer statistic drops below zero. Thus, the data transfer statistic may "exceed" the threshold in the sense that the data transfer statistic has moved past the threshold. In some examples, different subscribers may have different thresholds.

When the callout operation adds the session record to PFE FIFO 220, the callout operation may add all or parts of the session record to PFE FIFO 220. For example, the callout operation may add sufficient data to identify the subscriber session associated with the session record and the data transfer statistic to PFE FIFO 220. In this example, the callout operation may omit elements of the session record that indicate which packet processing operations to perform on packets in the session.

TOE 212 pushes session records from PFE FIFO 220 to FU FIFO 228. Thus, TOE 212 is configured to move data transfer statistics from PFE FIFO 220 to FU FIFO 228 without first receiving a request to move session records from PFE FIFO 220 to FU FIFO 228. FIG. 6, described below, is a flowchart that illustrates an example operation of TOE 212. To push session records from PFE FIFO 220 to FU FIFO 228, TOE 212 determines whether there are any session records in PFE FIFO 220. If there is a record in PFE FIFO 220 and there is sufficient space in FU FIFO 228 for the session record, TOE 212 moves the session record from PFE FIFO 220 to FU FIFO 228. In other words, TOE 212 may remove the session record from PFE FIFO 220 and write the session record to an end of FU FIFO 228. In various examples, TOE 212 may write the session record to FU FIFO 228 in various ways. For instance, in some examples, TOE 212 may write the session record to FU FIFO 228 using direct memory access (DMA).

TOE 212 may determine whether there any records in PFE FIFO 220 in response to various events. For example, TOE 212 may poll PFE FIFO 220 on a periodic basis to determine whether there are any records in PFE FIFO 220. In another example, the callout operation may send a signal to TOE 212 whenever the callout operation adds a session record to PFE FIFO 220. Thus, TOE 212 does not necessarily determine whether there are records in PFE FIFO 220 in response to a request from processor 112A or another component of forwarding unit 16A outside PFE 110A.

In various examples, TOE 212 is implemented in various ways. For example, one or more special-purpose integrated circuits within PFE 110A may provide the functionality of TOE 212. In this example, the special-purpose integrated circuits that provide the functionality of TOE 212 may or may not be separate from the integrated circuits that provide the functionality of threads 208, distribution unit 214, and/or other functional components of PFE 110A.

In this manner, PGW 80 collects subscriber specific data transfer information matching PCC rules generated by PCRF 10 based on subscriber-independent data collection criteria received from analytics system 12 that, in turn, is modified by controller 14 based on the analysis of the subscriber specific data transfer information collected by PGW 80 by analytics system 12.

FIG. 6 is a flowchart illustrating an example mode of operation of a network system using analytics based reporting according to techniques described in this disclosure. The example mode of operation is described with respect to network system 2 of FIG. 1. Mobile network gateway 4 boots up and sends an analytics session request to analytics system 12 (300). Analytics system 12 responds to the request by sending a list of analytics information AVPs, which include an analytics key and a reporting timer (302). The reporting time trigger configured mobile network gateway 4 to report the requested network traffic data at after a particular amount of time (e.g., after a threshold amount of time elapses since the data collection was initiated or since mobile network gateway 4 last reported the requested network traffic data to analytics system 12). The analytics key includes a reference to the type of analytics information data being collected (e.g., the type of network traffic information being collected). One example AVP format is as follows:

Analytics Information::=<AVP Header: 1003>
        <Analytics-Key>
        <Reporting-Timer>

Analytics server 12 and PCRF 10 exchange traffic matching criteria for each analytics key (304). The traffic matching criteria includes both subscriber matching information (e.g., location, type of subscriber, device type, etc.) as well as traffic matching information (e.g., application-ID, L3/L4 rules, etc.). After the Gx/Sd session trigger occurs at mobile network gateway 4, mobile network gateway 4 sends a credit-control-request (CCR) to PCRF 10 that includes a request to download the subscriber-specific rules from PCRF 10 (306). The CCR includes a subscriber identifier corresponding to the subscriber for which mobile network gateway 4 is requesting information as well as session information, such as location, radio access technology (RAT) type, etc. Responsive to receiving the CCR, PCRF 10 sends a credit-control-answer (CCA) that includes one or more subscriber-specific rules that correspond to the subscriber identifier and session information included in the CCR (308). The subscriber-specific rules include an application key against which packets flows for the subscriber are counted.

After the timer trigger occurs (e.g., after the specified amount of time has elapsed since initialization or since mobile network gateway 4 last send a report to analytics system 12), mobile network gateway 4 provides a report of the data collected for each of the subscriber-specific rules that are installed at mobile network gateway 4 to analytics system 12 (310). The report typically includes an amount of data transferred for each of the packet flows and may include and aggregated amount of data transferred across all of the packet flows. The report may also include usage information for each of the analytics keys specified in the subscriber specific rules installed at mobile network gateway 4. Analytics system 12 analyzes the report and determines whether to install new or different subscriber specific rules in order to collect additional or different information about the packet flows. The subscriber specific rules may also be referred to as "access control rules" as these subscriber specific rules are used in configuring mobile network gateway 4 to collect the additional or different information about the packets flows. For example, analytics server 12 may determine that packets flows having certain characteristics (e.g., location, device type, radio access technology type, application type, etc.) may need to be further investigated and, thus, require mobile network gateway 4 to collect more granular data on the particular packet flows.

Responsive to determining that the analytics strategy needs to change, analytics system 12 provides updated data collection criteria to PCRF 10 (312). The data collection criteria reflect the change in the analytics strategy. PCRF 10 generates, based on the updated data collection criteria, updated subscriber-specific policies and provides the updated subscriber specific policies to mobile network gateway 4 (314). The update network subscriber specific policies may be provided to mobile network gateway 4 using a re-authentication request and re-authentication answer sequence according to the Diameter protocol and may included updated traffic matching criteria and an update reporting timer. After the updated timer trigger occurs, mobile network gateway 4 provides a report of the new data collected for each of the updated subscriber-specific rules that are installed at mobile network gateway 4 to analytics system 12 (316).

Figure 7A:
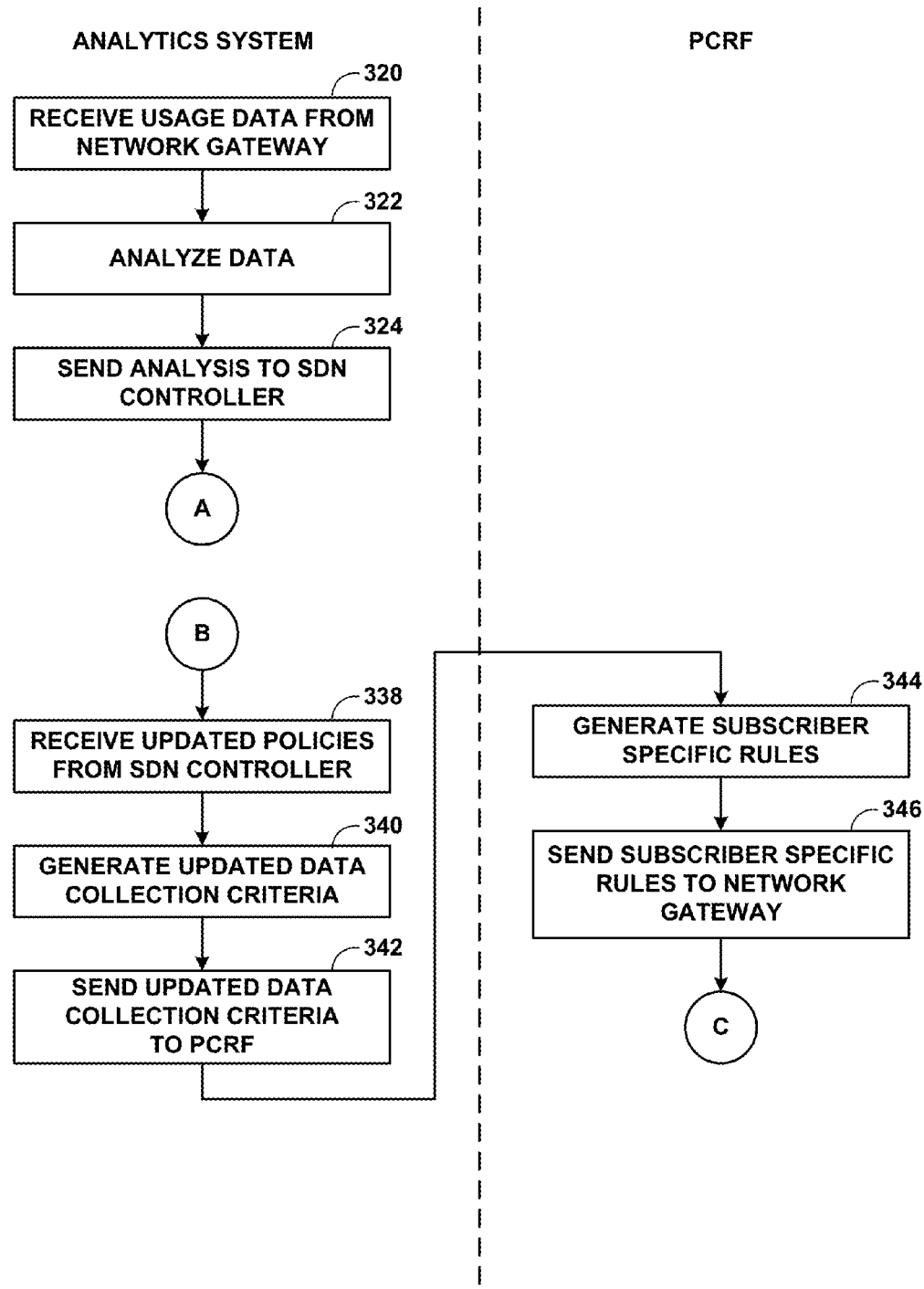
FIGS. 7A-7C depict a flowchart illustrating an example mode of operation of a network system performing according to techniques described in this disclosure.
Figure 7B:
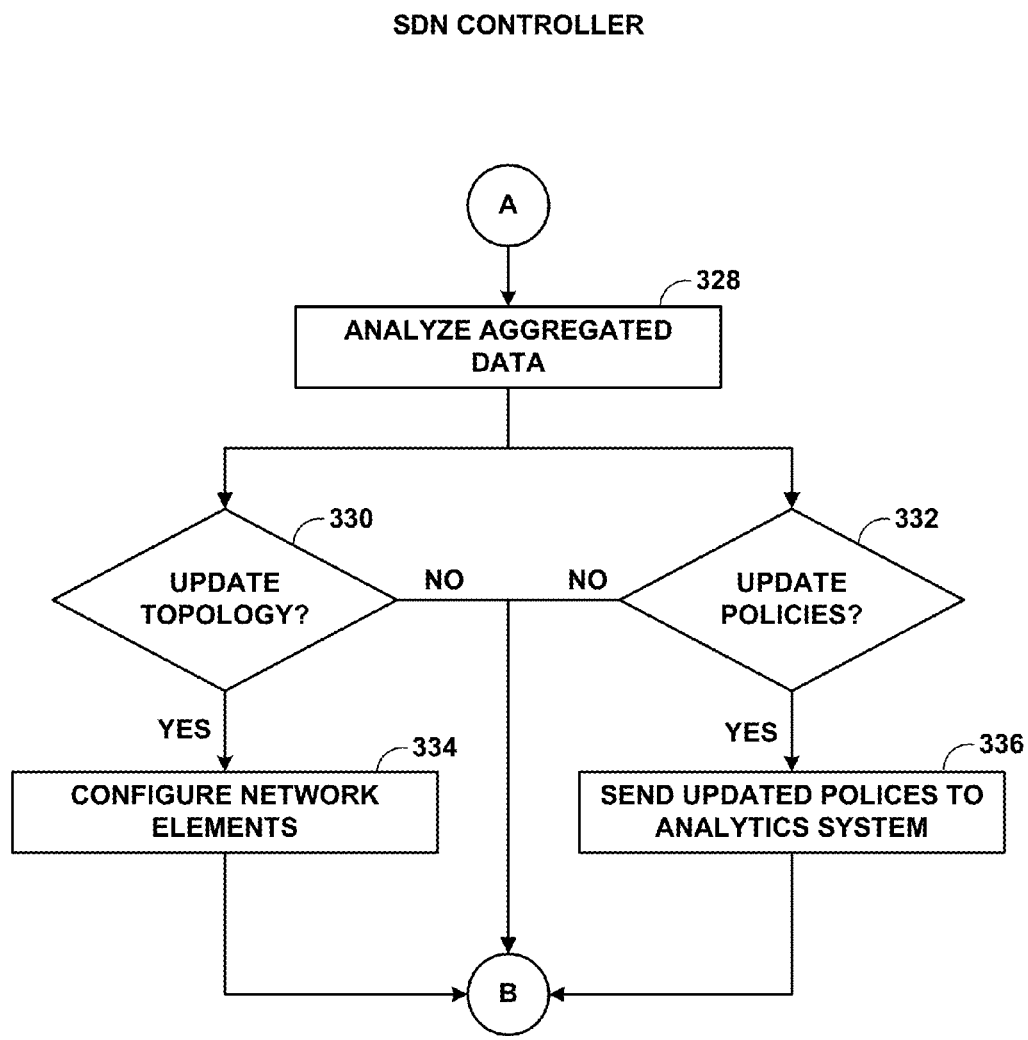
Figure 7C:
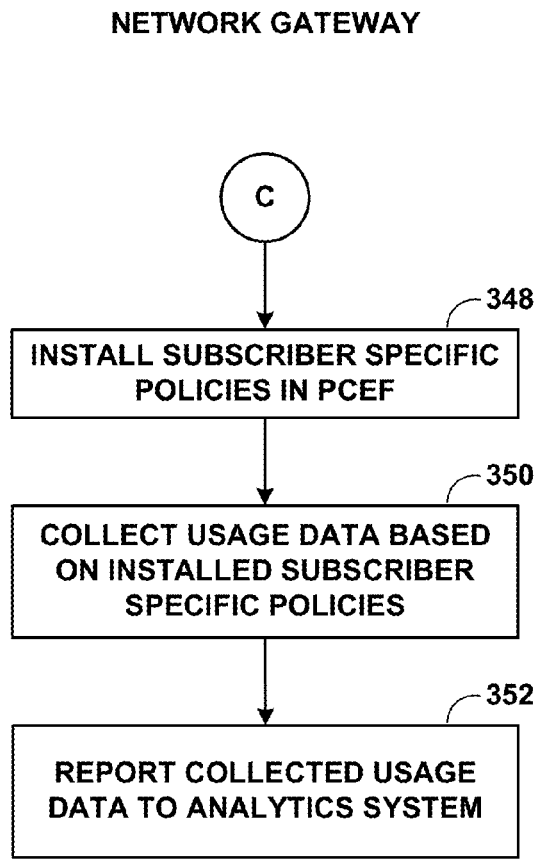

FIGS. 7A-7C depict a flowchart illustrating an example mode of operation of a mobile network gateway to apply charging control at the rating group level for a subscriber session according to techniques described in this disclosure. The example mode of operation is described with respect to network system 2 of FIG. 1, analytics system 40 of FIG. 2, PCRF 60 of FIG. 3, and PGW 80 of FIG. 4. While illustrated as a single iteration, the operation may be performed as a continuous feedback loop in which an analytics system receives network traffic data from a mobile network gateway, analyzes the data, sends the analysis to a software-defined network (SDN) controller, receives updated network policies from the SDN controller, generates updated data collection criteria that are sent to a PCRF which, in turn generates subscriber-specific rules based on the updated data collection criteria and installs the subscriber-specific rules in the mobile network gateway, which uses the subscriber-specific rules for collecting network traffic data that is reported to the analytics system.

Analytics system 40 receives network traffic data from PGW 60 (320) and analyzes the data to determine whether any changes to the subscriber specific rules need to be made (322). In some examples, analytics system 40 aggregates the data across subscribers and sends the aggregated data to controller 14 (324). Controller 14 analyzes the aggregated data (328) and determines whether any changes need to be made to the network polices or network topology (e.g., to reduce network congestion) (330 and 332). If controller 14 determines that changes need to be made to the network topology ("YES" branch of 330), controller 14 configures one or more network elements (334). Configuring the network elements to change the network topology may include changing routing information, creating new virtual machines to handle a particular type of traffic (e.g., to apply services to the particular type of traffic), reconfiguring existing virtual machines, etc. If controller 14 determines that one or more network policies need to be changed ("YES" branch of 332), controller 14 sends the updated network policies to analytics system 14 (336).

Analytics system 12 receives the updated network policies from controller 14 (338) and generates updated data collection criteria based on the network policies received from controller 14 (340). The generated data collection criteria do not specify individual subscribers for which to collect data. Rather, the generated data collection criteria are high-level data collection criteria that specify geographic locations, times of day, applications types, device types, etc. for which mobile network gateway 4 should collect data. The generated data collection criteria also include traffic matching information that specifies a type of packet flows on which analytics system 12 is requesting traffic data. Analytics system 12 sends the generated data collection criteria to PCRF 10 (342).

PCRF 10 generates subscriber-specific rules from the generated data collection criteria (344). That is, PCRF 10 translates high-level data collection criteria into low-level subscriber-specific rules. In order to generate the subscriber-specific rules, PCRF 10 identifies one or more subscribers that match subscriber matching information included in the generated data collection criteria. For each matching subscriber, PCRF 10 creates one or more new subscriber-specific rules that specify what network traffic (e.g., packet flows) mobile network gateway 4 should analyze and collect data. PCRF 10 sends the subscriber-specific rules to mobile network gateway 4 (346).

Mobile network gateway 4 installs the rules (i.e., into PCEF 22 and forwarding plane 26) (348). As packets traverse mobile network gateway 4 from various subscribers, forwarding plane 26 collected usage data for the packet flows that match the install subscriber specific rules (350). After a threshold amount of time elapses (i.e., a report trigger occurs), mobile network gateway 4 sends a report of the collected network traffic data to analytics system 12 (352).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   identifying, by a policy charging and rule function device and based on subscriber independent data collection criteria, one or more target subscribers from a plurality of subscribers, the subscriber independent data collection criteria including subscriber matching criteria and traffic matching criteria, the subscriber matching criteria including one or more of location information, a radio access technology type, a subscriber type, or a device type;
   for each of the one or more target subscribers, generating, by the policy charging and rule function device and based on the subscriber independent data collection criteria, subscriber specific policy and charging control rules that include the traffic matching criteria; and
   sending, by the policy charging and rule function device to a mobile network gateway, the subscriber specific policy and charging control rules to cause the mobile network gateway to collect network traffic data for network traffic of the one or more target subscribers that matches the traffic matching criteria.

2. The method of claim 1, further comprising:
   aggregating the network traffic data collected for the one or more target subscribers into aggregated traffic data;
   identifying, based on the aggregated network traffic data, network congestion in a part of a network; and
   updating routing information at one or more network devices to cause at least a portion of network traffic to be routed through a different part of the network.

3. The method of claim 1, further comprising:
   aggregating the network traffic data collected for the one or more target subscribers into aggregated traffic data;
   determining, based on the aggregated network traffic data, whether the subscriber independent data collection criteria for a network need to be updated; and
   responsive to determining that the one or more subscriber independent data collection criteria need to be updated:
      updating, based on the aggregated network traffic data, the subscriber independent data collection criteria, the updated subscriber independent data collection criteria including updated subscriber matching criteria and updated traffic matching criteria;
      identifying one or more subscriber sessions that match one or more of the updated subscriber matching criteria;
      for each of the one or more identified subscriber sessions, generating updated subscriber specific policy and charging control rules that include at least a portion of the updated traffic matching criteria specific by the updated subscriber independent data collection criteria; and
      applying the updated subscriber specific policy and charging control rules to additional network traffic to collect additional network traffic data.

4. The method of claim 3,
   wherein the network traffic data is aggregated based at least in part on a radio access technology type associated with mobile devices sending and receiving the network traffic and a respective geographic location for each of the mobile devices, wherein the updated subscriber independent data collection criteria indicate more granular data collections for network traffic associated with the geographic region, wherein the updated subscriber specific policy and charging control rules specify subscribers located in the geographic region and additional data to collect for network traffic associated with the subscribers located in the geographic region, and wherein applying the updated subscriber specific policy and charging control rules comprises applying the updated subscriber specific policy and charging control rules to the additional network traffic to collect more granular information about the network traffic for the subscribers located in the geographic region.

5. The method of claim 1, further comprising:

responsive to determining that one or more virtual machines providing a type of service are overloaded, creating, by a software-defined network controller, one or more virtual machines to provide the type of service to the network traffic; and updating routing information at one or more network devices to cause at least a portion of the network traffic to be serviced by the one or more created virtual machines.

6. The method of claim 1, further comprising:

aggregating, based at least in part on a radio access technology type associated with mobile devices sending and receiving the network traffic and a respective geographic location for each of the mobile devices, the network traffic data collected for the one or more target subscribers into aggregated traffic data;

identifying, based on the aggregated network traffic data, one or more congested cell sites; and allocating additional radio resources at the one or more congested cell site.

7. The method of claim 1, aggregating, based at least in part on an application associated with network traffic, the network traffic data collected for the one or more target subscribers into aggregated traffic data; and adjusting quality of service parameters for the application.

8. The method of claim 1, further comprising identifying, based on the traffic matching criteria of the subscriber specific policy and charging control rule associated with a target subscriber from the one or more target subscribers, a packet flow; and storing an indication of an amount of data included in the packet flow.

9. A network system comprising:

a mobile network gateway; and a policy charging and rule function device that identifies, based on subscriber independent data collection criteria, one or more target subscribers from a plurality of subscribers, the subscriber independent data collection criteria including subscriber matching criteria and traffic matching criteria, the subscriber matching criteria including one or more of location information, a radio access technology type, a subscriber type, or a device type, generates, for each of the one or more target subscribers and based on the subscriber independent data collection criteria, subscriber specific policy and charging control rules that include the traffic matching criteria, and sends, to the mobile network gateway, the subscriber specific policy and charging control rules, wherein the mobile network gateway, in response to receiving the subscriber specific policy and charging control rules, collects network traffic data for network traffic of the one or more target subscribers that matches the traffic matching criteria.

10. The network system of claim 9, further comprising:

an analytics system that aggregates the network traffic data collected for the one or more target subscribers into aggregated traffic data; and a software-defined network controller that identifies, based on the aggregated network traffic data, network congestion in a part of a network, and updates routing information at one or more network devices to cause at least a portion of network traffic to be routed through a different part of the network.

11. The network system of claim 9, further comprising:

an analytics system that aggregates the network traffic data collected for the one or more target subscribers into aggregated traffic data, determines, based on the aggregated network traffic data, whether the subscriber independent data collection criteria for a network need to be updated, and, responsive to determining that the one or more subscriber independent data collection criteria need to be updated, updates, based on the aggregated network traffic data, the subscriber independent data collection criteria, the updated subscriber independent data collection criteria including updated subscriber matching criteria and updated traffic matching criteria, wherein the policy charging and rule function device identifies one or more subscriber sessions that match one or more of the updated subscriber matching criteria, and, for each of the one or more identified subscriber sessions, generates updated subscriber specific policy and charging control rules that include at least a portion of the updated traffic matching criteria specific by the updated subscriber independent data collection criteria, wherein the mobile network gateway applies the updated subscriber specific policy and charging control rules to additional network traffic to collect additional network traffic data.

12. The network system of claim 11, wherein the network traffic data is aggregated based at least in part on a radio access technology type associated with mobile devices sending and receiving the network traffic and a respective geographic location for each of the mobile devices, wherein the updated subscriber independent data collection criteria indicate more granular data collections for network traffic associated with the geographic region, wherein the updated subscriber specific policy and charging control rules specify subscribers located in the geographic region and additional data to collect for network traffic associated with the subscribers located in the geographic region, and wherein the mobile network gateway applies the updated subscriber specific policy and charging control rules to the additional network traffic to collect more granular information about the network traffic for the subscribers located in the geographic region.

13. The network system of claim 9, further comprising:

a software-defined network controller that, responsive to determining that one or more virtual machines providing a type of service are overloaded, create one or more virtual machines to provide the type of service to the network traffic, and updates routing information at one or more network devices to cause at least a portion of the network traffic to be serviced by the one or more created virtual machines.

14. The network system of claim 9, further comprising:
an analytics system that aggregates, based at least in part on a radio access technology type associated with mobile devices sending and receiving the network traffic and a respective geographic location for each of the mobile devices, the network traffic data collected for the one or more target subscribers into aggregated traffic data; and
a software-defined network controller that identifies, based on the aggregated network traffic data, one or more congested cell sites, and allocates additional radio resources at the one or more congested cell site.

15. The network system of claim 9, further comprising:
an analytics system that aggregates, based at least in part on an application associated with network traffic, the network traffic data collected for the one or more target subscribers into aggregated traffic data; and
a software-defined network controller that adjusts quality of service parameters for the application.

16. The network system of claim 9,
wherein the policy charging and rule function device identifies, based on the traffic matching criteria of the subscriber specific policy and charging control rule associated with a target subscriber from the one or more target subscribers, a packet flow and stores an indication of an amount of data included in the packet flow.

17. A non-transitory computer-readable storage media encoded with instructions that, when executed by one or more processors of a network device, cause the network device to:
identify, based on subscriber independent data collection criteria, one or more target subscribers from a plurality of subscribers, the subscriber independent data collection criteria including subscriber matching criteria and traffic matching criteria, the subscriber matching criteria including one or more of location information, a radio access technology type, a subscriber type, or a device type;
for each of the one or more target subscribers, generate, based on the subscriber independent data collection criteria, subscriber specific policy and charging control rules that include the traffic matching criteria; and
send, to a mobile network gateway, the subscriber specific policy and charging control rules to cause the mobile network gateway to collect network traffic data for network traffic of the one or more target subscribers that matches the traffic matching criteria.

18. The non-transitory computer-readable storage media of claim 17, further encoded with instructions that cause the one or more processors to:
receive, from an analytics system, updated subscriber independent data collection criteria;
generate, for each of the one or more identified subscriber sessions, updated subscriber specific policy and charging control rules that include at least a portion of the updated traffic matching criteria specific by the updated subscriber independent data collection criteria; and
send, to the mobile network gateway, the updated subscriber specific policy and charging control rules to cause the mobile network gateway to collect additional network traffic data based on the updated subscriber specific policy and charging control rules.

19. The non-transitory computer-readable storage media of claim 18,
wherein the updated subscriber independent data collection criteria are determined based on network traffic data aggregated based at least in part on a radio access technology type associated with mobile devices sending and receiving the network traffic and a respective geographic location for each of the mobile devices,
wherein the updated subscriber independent data collection criteria indicate more granular data collections for network traffic associated with the geographic region,
wherein the updated subscriber specific policy and charging control rules specify subscribers located in the geographic region and additional data to collect for network traffic associated with the subscribers located in the geographic region, and
wherein the updated subscriber specific policy and charging control rules cause the mobile network gateway to collect more granular information about the network traffic for the subscribers located in the geographic region.

20. The non-transitory computer-readable storage media of claim 17, further encoded with instructions that cause the one or more processors to:
identify, based on the traffic matching criteria of the subscriber specific policy and charging control rule associated with a target subscriber from the one or more target subscribers, a packet flow; and
store an indication of an amount of data included in the packet flow.

* * * * *